Aug. 30, 1955

J. W. SCHROEDER 2,716,492

FILTERING DEVICE

Filed Oct. 25, 1954

INVENTOR.
JOHN W. SCHROEDER
BY Lynn & Latta

ATTORNEY

United States Patent Office 2,716,492
Patented Aug. 30, 1955

2,716,492
FILTERING DEVICE
John Wesley Schroeder, Monterey Park, Calif.
Application October 25, 1954, Serial No. 464,498
4 Claims. (Cl. 210—178)

The invention relates to a filtering device and more particularly to an improved form of filter assembly for filtering the oil in a lubricating system, such as the lubricating system of an automotive type internal combustion engine.

Filtering devices which employ a porous metallic type of filtering element are in use today, the filtering elements usually being generally cone shaped and being formed under pressure from powered metallic material and then being subsequently subjected to a sintering operation resulting in a rigid thin-walled filtering element having a degree of porosity which is suitable for filtering the impurities from the oil in an automotive lubricating system.

One object of the invention is to provide a filtering device in which the filtering element is made up of opposed cones abutting each other in end to end fashion and held together in a manner such as to assure a suitable seal between the two cones.

Another object of the invention is to provide a filtering device in which the filtering element is comprised of two mating cones secured to each other and supported on a hollow outlet tube in such a manner as to have a very effective sealing engagement with the outer wall of said tube.

Another object of the invention is to provide in a filtering device a filtering unit in which the removal of the unit for cleaning or for replacing is extremely simple and speedy.

Another object of the invention is to provide an assembled filtering unit which automatically effects sealing engagement with the outer wall of its supporting tube when installed thereon.

Another object of the invention is to provide a filtering element assembly formed of mating cones and having effective means for sealing the ends of the cones as well as effecting a seal with the outer wall of the supporting tube.

Other objects and advantages of the invention will be apparent from the ensuing specification and appended drawing in which.

Figure 1:
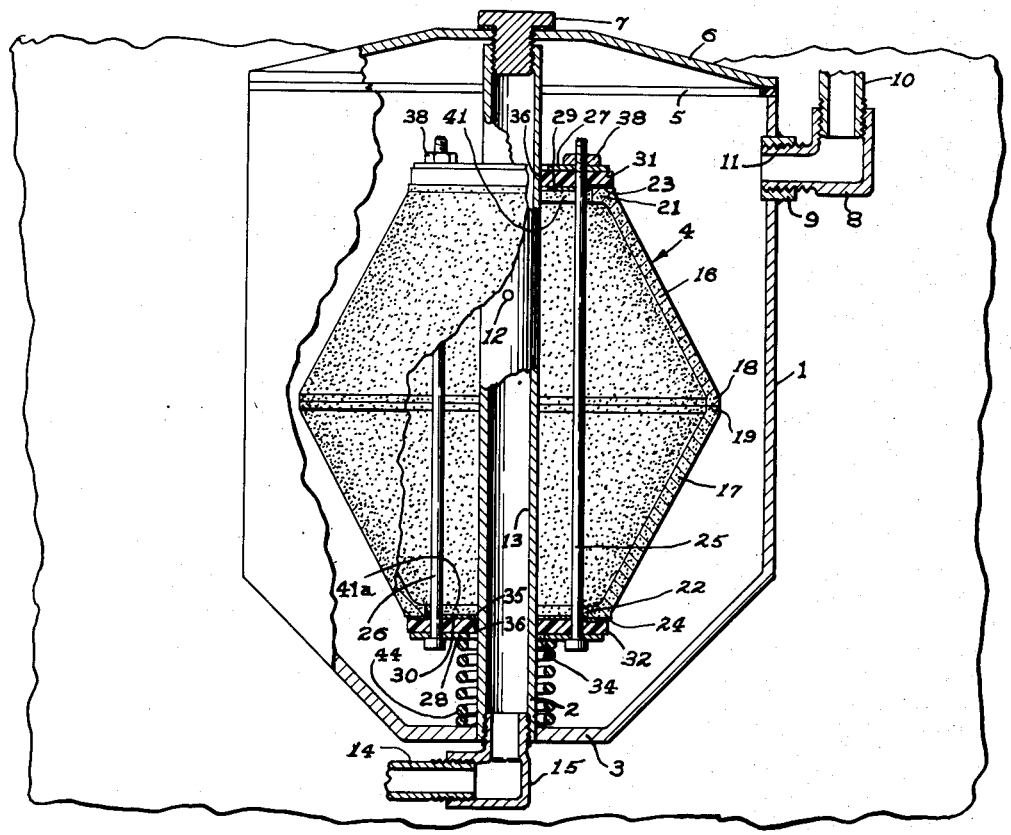
Fig. 1 is a side elevational view of a filtering device shown partially in section as it may be mounted on the side of an internal combustion engine.

In general the filtering device is of the type in which the outer receptacle 1 has a central discharge tube 2 firmly fixed in the end wall 3 thereof as by means of welding or otherwise, such discharge tube serving as the supporting post for the filtering element assembly which may be referred to generally by the numeral 4.

When the filtering element assembly has been pushed on to the supporting tube, then the gasket 5 will be positioned at the end of the receptacle and cover 6 will have its periphery tightened against the gasket by means of the bolt 7 which is tightened into the internally threaded end of the supporting tube 2. The oil will not escape through the upper end of the supporting tube due to the seal effected by the threading of the bolt into the end of said tube and the gasket 5, of course, will provide an effective seal for preventing the escape of oil between the end of the receptacle and the periphery of the cover 6. A suitable fitting 8 may be threaded into the insert 9 which opens into the interior of the receptacle and the tubing 10 will of course be connected into the circuit of the lubricating system so that the oil will travel from the internal combustion engine through the inlet opening 11 under pressure into the interior of the receptacle 1 from whence it must travel through the porous walls of the filtering element 4 into the hollow interior thereof and thence through the opening 12 in the tube 2, such opening establishing communication between the interior of the filtering element and the hollow interior 13 of the tube. When the oil enters the interior of the tube through the opening 12, it has of course been filtered and is then discharged through the outlet tubing 14 which is threaded into the fitting 15 which in turn is threaded into the lower end of tube 2. The outlet tubing 14 of course returns to the circuit of the lubricating system of the internal combustion engine in a conventional manner.

The filtering element assembly 4 is made up of two identical mating cones 16 and 17 which are of generally frusto-conical shape, each having a circular rim portion 18 and 19 with flat end surfaces which when brought into abutment with each other as shown in Fig. 1 form an effective seal throughout the entire circular extent of such end surfaces. In the fabrication of these cones, of course, it is very important that the end surfaces thereof be truly flat in order to form an effective seal when the two cones are brought into abutment with each other. The effectiveness of the seal is also made possible by providing suitable means for applying considerable pressure at opposite ends of the cones for holding the cones together.

Figure 3:
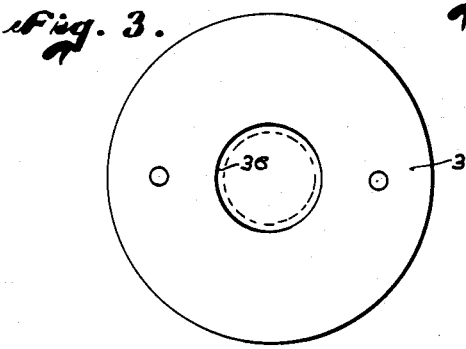
Fig. 3 is a detail plan view of the sealing washer.

The outer ends of each cone are provided with radially inwardly extending flanges 21 and 22 which afford the flat circular end surfaces 23 and 24 of generous surface area extent for providing the necessary sealing as well as supporting surfaces to receive the load imposed thereon by the tension bolts 25 and 26. At the outer end of each cone supporting washers 27, 28, 29 and 30 are provided and the resilient and compressible sealing washers 31 and 32 are sandwiched therebetween. Each of the supporting washers may be formed of generally rigid metallic material, such as steel stampings, having central openings 34 and 35 therein of sufficient diameter to accommodate possible variations in the outside diameter of the supporting tube 2 and the central openings 36 in the sealing washers are preferably of smaller diameter than the openings in the supporting washers, since the inside diameters of the openings in the sealing washers will change when they are compressed as a result of the tightening of the nuts 38 which are threaded onto the ends of the tension bolts. In Fig. 3 I have indicated in dotted lines how the inside diameter of the opening 36 in the sealing washer may be constricted by the tightening of the nuts 38 thereby assuring that these washers will hug the external wall of the tube 2 very snugly. The sealing washers may be fabricated from a synthetic plastic material such as buta-diene so as to be resistant to the effect of the lubricating oil.

Figure 4:
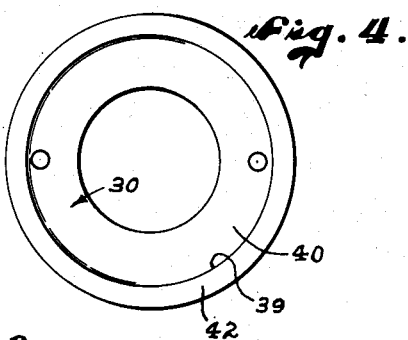
Fig. 4 is a detail plan view of the inner clamping washer.
Figure 2:
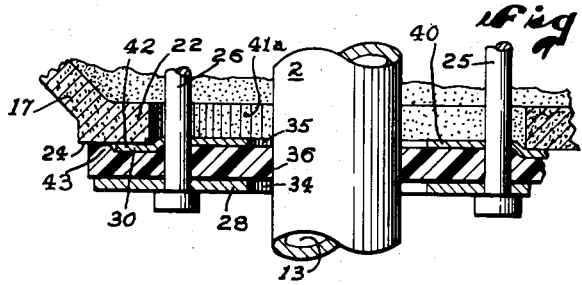
Fig. 2 is an enlarged fragmentary detail of one end of the filtering element.

Referring to the enlarged detail views of Figs. 2, 3 and 4 it will be noted that the inner washers 29 and 30 are annularly crimped at 39 providing the recessed central portions 40 which project into the interior of the respective openings 41 and 41a at ends of the cones and the annular rim portions 42 overhang and rest against the annular end faces of the cones. The outside diameter of the inner washers is considerably less than the outside diameter of the sealing washers thereby permitting the circumferential margins 43 of the sealing washers to be pressed into sealing engagement with the end faces 23 and 24 of the cones in order to effect a suitable seal for preventing escape of oil at the ends of the cones. The outside diameter of the outer supporting washers 27 and 28 is greater than the outside diameter of the inner washers to provide the necessary overhanging annular supporting area for causing the circumferential margins of the sealing washers to be sealed against the end faces of the cones as best shown in Fig. 2.

In the fabrication of the filter assembly 4 the parts are assembled in the manner as shown in Fig. 1 and nuts 38 are tighened sufficiently so as to constrict the inside diameter of the openings 36 in the sealing washers sufficiently to assure a snug fit against the internal wall of the tube 2 and the filtering element assembly is installed onto the tube 2 by removing the cover 6 and simply pushing the filtering unit onto the end of the tube and working it downwardly along said tube until it engages the compression spring 44. The filtering unit 4 may be utilized with receptacle assemblies in which the outside diameter of the tubes 2 vary slightly and in such instances the sealing washers may fit more snugly against the outer wall of the tubes which have a slightly larger outside diameter.

In removing the filtering unit from the receptacle, it is only necessary to first remove the cover 6 and then manually grasp the filter unit and pull it axially of the tube 2 until it is free of same. Then the filter unit may be cleaned with a suitable solvent while remaining in the assembled condition as shown in Fig. 1 or if desired it can be disassembled by removing the nuts 38 and then cleaned and reassembled.

The filtering device as shown in Fig. 1 may be utilized as a "full-flow" or as a "shunt" type filter, in the former instance the entire supply of oil in the lubricating system travels through the filtering unit and in the second instance the filtering device is arranged within a by-pass circuit which is tapped into the main lubrication circuit. When the filtering device is utilized as a "full-flow" filter, it is usually desirable to provide a by-pass valve (not shown) in the lubricating system for partially by-passing the filtering device in event it becomes so plugged as to impair the efficient operation of the lubricating circuit.

I claim:

1. An oil filtering device for use in filtering impurities from the oil in a lubricating circuit of an internal combustion engine comprising: an outer receptacle having an inlet opening therein for establishing communication between the interior of the receptacle and the lubricating circuit; a hollow support stem projecting through the interior of the receptacle and being supported thereby; separable filtering elements which when arranged in abutment with each other form an enclosed hollow porous shell having openings at its opposite ends, said shell through the medium of the openings being telescopically positioned on the stem, said stem having an opening therein for establishing communication between the interior of the shell and the interior of the stem and being open at one end for providing an outlet having communication with the lubricating circuit; and means for simultaneously urging the filtering elements into abutment with each other whereby to form the hollow shell and to effect a seal at each of the open ends of the filtering elements between the filtering elements and the outer surface of the stem, said means including tension bolts projecting through the interior of the shell; supporting washers at each end of the shell; resilient and compressible sealing washers sandwiched between each set of supporting washers, all of said washers having openings therein through which the hollow stem projects; and fastening means at the ends of the bolts for applying tension against the washers in a direction axially of the stem to urge the washers into tight engagement with the ends of the filtering elements, whereby to compress the sealing washers so as to constrict the openings therein and thereby effect a seal of said washers against the outer surface of the stem.

2. A filtering device as set forth in claim 1 wherein the openings in the sealing washers are normally of a diameter greater than the outside diameter of the stem.

3. A filtering device as set forth in claim 1 wherein the ends of the filtering elements surrounding the openings present flat surfaces the outer peripheral margins of which are of greater diameter than the outside diameter of the innermost supporting washers so that the outer peripheral margins of the sealing washers are compressed so as to overhang the outer margins of the innermost supporting washers and so as to engage the end surfaces of the filtering elements to effect a seal thereagainst.

4. A filtering device as set forth in claim 3 wherein the innermost supporting washers have indented central portions which project into the interior of the openings in the filtering elements said washers having annular flange portions circumscribing the indented central portions, said flange portions engaging the end surfaces of the filtering elements.

References Cited in the file of this patent

UNITED STATES PATENTS

| | | |
|---|---|---|
| 2,424,211 | Webb | July 15, 1947 |
| 2,525,330 | Zaun | Oct. 10, 1950 |
| 2,592,972 | Strassheim | Apr. 15, 1952 |
| 2,641,365 | Lundeen | June 9, 1953 |

FOREIGN PATENTS

| | | |
|---|---|---|
| 149,808 | Great Britain | Aug. 26, 1920 |